(12) United States Patent
Ragnar et al.

(10) Patent No.: US 11,436,897 B1
(45) Date of Patent: Sep. 6, 2022

(54) ANTI-SKIMMING CARD READER

(71) Applicant: Wayne Fueling Systems LLC, Austin, TX (US)

(72) Inventors: Sten Harald Ragnar, Torna Hällestad (SE); Roger Kristian Månsson, Lund (SE)

(73) Assignee: Wayne Fueling Systems LLC, Austin, TX (US)

( * ) Notice: Subject to any disclaimer, the term of this patent is extended or adjusted under 35 U.S.C. 154(b) by 0 days.

(21) Appl. No.: 17/181,505

(22) Filed: Feb. 22, 2021

(51) Int. Cl.
*G07F 19/00* (2006.01)
*G06K 7/08* (2006.01)

(52) U.S. Cl.
CPC ......... *G07F 19/2055* (2013.01); *G06K 7/087* (2013.01)

(58) Field of Classification Search
CPC ............................ G07F 19/2055; G06K 7/087
See application file for complete search history.

(56) References Cited

U.S. PATENT DOCUMENTS

| | | | |
|---|---|---|---|
| 5,929,427 A | 7/1999 | Harada et al. | |
| 8,418,917 B1 | 4/2013 | Lewis et al. | |
| 8,474,700 B1 | 7/2013 | Lewis et al. | |
| 9,589,427 B1 | 3/2017 | Ohlsson | |
| 9,805,560 B2 | 10/2017 | Ohlsson | |
| 10,417,461 B2 | 9/2019 | Rotsaert | |
| 2009/0159687 A1* | 6/2009 | Clark | G07F 19/207 235/475 |
| 2016/0148023 A1 | 5/2016 | Lamfalusi et al. | |
| 2016/0335462 A1 | 11/2016 | Lamfalusi et al. | |

FOREIGN PATENT DOCUMENTS

| | | |
|---|---|---|
| CN | 1591459 A | 3/2005 |
| CN | 104838633 A | 8/2015 |
| EP | 0863477 A1 | 9/1998 |
| EP | 1513093 A2 | 3/2005 |
| EP | 1536367 A2 | 6/2005 |
| EP | 2629258 A1 | 8/2013 |
| EP | 3398154 A1 | 11/2018 |
| KR | 20070075724 A | 7/2007 |
| WO | 2016081804 A1 | 5/2016 |

(Continued)

OTHER PUBLICATIONS

Extended European Search Report issued in European Application No. 16882499.3, dated Oct. 29, 2019, 10 pages.

(Continued)

*Primary Examiner* — Matthew Mikels
(74) *Attorney, Agent, or Firm* — Mintz Levin Cohn Ferris Glovsky and Popeo, PC; Lisa Adams

(57) ABSTRACT

An anti-skimming card reader device, and systems and methods for using the same, are provided. The card reading device can include a plate having a first surface and a second surface opposite the first surface. The device can also include a magnetic stripe reader disposed at the second surface. The magnetic stripe reader can include at least one sensor configured to acquire data from a magnetic stripe of a card disposed at the first surface and at least one proximity sensor configured to detect that the card is disposed at the first surface and to cause the at least one sensor to acquire the data from the magnetic stripe.

25 Claims, 7 Drawing Sheets

(56) References Cited

FOREIGN PATENT DOCUMENTS

WO      2017117110 A1     7/2017

OTHER PUBLICATIONS

International Preliminary Report on Patentability received for PCT International Application No. PCT/US2016/068681, dated Jul. 12, 2018, 8 pages.
International Search Report and Written Opinion received for PCT Patent International Application No. PCT/US2016/068681, dated Feb. 7, 2017, 7 pages.
International Search Report and Written Opinion received for PCT Application No. PCT/US2022/070533, dated May 6, 2022, 14 pages.

\* cited by examiner

ANTI-SKIMMING CARD READER

FIELD

An anti-skimming card reader device, and systems and methods for using the same, are provided.

BACKGROUND

Credit card readers are required in a large number of situations, such as when paying for fuel at a fuel dispenser, retrieving cash from an Automated Teller Machine (ATM), or in a retail setting. A card reader allows a customer to pay more efficiently without having to hand a credit card over to an employee or, in some situations like at a fuel dispenser or an ATM, without having to even interact with an employee. Some types of card readers are insertion-type manual card readers, which require the user to insert a credit card into a card slot formed in the card reader and then pull it back out. Other types of card readers are insertion-type motorized card readers, which can accept a user's credit card into the card slot, and the reader has rubber wheels that draw the card inside. However, the card slot of an insertion-type card reader is often exposed to the outdoor environment and can permit the intrusion of water and other contaminants into the card slot, which can cause components of the card reader to malfunction and/or fail.

An additional drawback with insertion-type card readers is that they can be susceptible to "skimming" by thieves who can install credit card "skimmer" devices on the card readers to intercept a customer's payment information. Credit card "skimmer" devices are small devices that can scan/store/transmit payment data encoded by a credit card's magnetic stripe as the card is inserted into the card slot. A credit card skimmer device is often placed on the card reader and over the card slot, and they include a magnetic stripe reader that aligns with the magnetic stripe reader of the card reader when the skimmer is positioned over the card slot. As such, when a credit card is inserted into the card slot for reading by the card reader, the magnetic stripe passes through the magnetic stripe reader of the skimmer, and the skimmer reads the payment data stored by the magnetic stripe and stores/transmits the payment data for later use by thieves. Thieves can use the stolen data to make fraudulent charges either online or with a counterfeit credit card.

To address this, many credit card manufacturers have started to include a microchip and pin system into their credit cards to circumvent these vulnerabilities of magnetic stripe use. These types of credit cards are often referred to as "chip cards" or "EMV ICC cards," and they can include a microchip on one end of the credit card that encodes payment data. Card readers in retail locations often include a dedicated slot for insertably receiving the end of the credit card that includes the microchip and that can read the encoded payment data from the microchip, and as such do not need to read the payment data encoded on the credit card's magnetic stripe to complete a transaction. However, card readers in fuel dispensers or other outdoor locations often use a combination card slot that can read both a magnetic stripe and a chip, and as such the credit card must be fully inserted into the card slot in order for the card reader to read the payment data encoded on the microchip. As such, despite the inclusion of the microchip plus pin system, the payment data encoded on the magnetic stripe of the credit card is still vulnerable to interception by a credit card skimmer device, such as that described above.

Accordingly, there remains a need for systems and devices for preventing skimming of cards in a card reader.

SUMMARY

Various card reader devices, and systems and methods for using the same, are provided.

In one embodiment, a card reading device is provided. The card reading device can include a plate having a first surface and a second surface opposite the first surface. The device can also include a magnetic stripe reader disposed at the second surface. The magnetic stripe reader can include at least one sensor configured to acquire data from a magnetic stripe of a card disposed at the first surface and at least one proximity sensor configured to detect that the card is disposed at the first surface and to cause the at least one sensor to acquire the data from the magnetic stripe. In some embodiments, the at least one proximity sensor can be integrated into the plate. In other embodiments, the at least one proximity sensor can be disposed at the second surface.

In some embodiments, the at least one sensor is disposed on a magnetic read head. In such an embodiment, the magnetic stripe reader can include a track disposed along the second surface, and the magnetic read head can be coupled to the track and configured to slide along the track to allow the at least one sensor to acquire the data from the magnetic stripe. In addition, in such an embodiment, the card reading device can further include a processor that is in operable communication with the at least one proximity sensor, the magnetic read head, and the at least one sensor, and the processor can be configured to receive proximity data from the at least one proximity sensor indicating that the card is disposed at the first surface, to cause the magnetic read head to slide along the track, and to cause the at least one sensor to acquire the data from the magnetic stripe based on the received proximity data.

In some embodiments, the at least one sensor can include a plurality of sensors, and each of the plurality of sensors can be disposed on one of a plurality of magnetic read heads. In such an embodiment, the at least one proximity sensor can include a plurality of proximity sensors configured to detect that the card is disposed at the first surface. And, in such an embodiment, the card reading device can include a processor in operable communication with each of the plurality of proximity sensors and the plurality of sensors, and the processor can be configured to receive proximity data from one or more of the plurality of proximity sensors indicating that the card is disposed at the first surface and to cause the plurality of sensors to acquire the data from the magnetic stripe based on the received proximity data.

In some embodiments, the at least one sensor can include a plurality of sensors, and each of the plurality of sensors can be configured to detect that the card is disposed at the first surface. In such an embodiment, one or more of the plurality of sensors can be a Hall element. And, in such an embodiment, the card reading device can include a processor in operable communication with each of the plurality of sensors, and the processor can be configured to receive proximity data from one or more of the plurality of sensors indicating that the card is disposed at the first surface and to cause the plurality of sensors to acquire the data from the magnetic stripe based on the received proximity data. And, in such an embodiment, each of the plurality of sensors can acquire a portion of the data from the magnetic stripe, and the processor can be further configured to receive the acquired data portions from each of the sensors, to determine the data characterizing the card from the acquired data portions, and to provide the data characterizing the card to a second processor remote from the card reading device.

In another embodiment, a system for collecting payment data is provided. The system can include a payment terminal that includes a housing and an electronics module disposed in the housing. The system can include a card reading device disposed on the electronics module, and the card reading device can include a plate including a first surface and a second surface opposite the first surface and a magnetic stripe reader disposed at the second surface. The magnetic stripe reader can be configured to acquire payment data through the plate from a magnetic stripe of a card disposed at the first surface.

In some embodiments, the payment terminal can be disposed in a fuel dispenser housing. In some embodiments, the magnetic stripe reader can include a magnetic read head including at least one sensor configured to acquire the data from the magnetic stripe. In such an embodiment, the magnetic stripe reader can include a track disposed along the second surface, and the magnetic read head can be coupled to the track and configured to slide along the track to allow the at least one sensor to acquire the data from the magnetic stripe. And, in such an embodiment, the magnetic stripe reader can include a proximity sensor configured to detect that the card is disposed at the first surface. And, in such an embodiment, the system can include a processor in operable communication with the proximity sensor, the magnetic read head, and the at least one sensor, and the processor can be configured to receive proximity data from the proximity sensor indicating that the card is disposed at the first surface, to cause the magnetic read head to slide along the track, and to cause the at least one sensor to acquire the data from the magnetic stripe based on the received proximity data. And, in such an embodiment, the processor can be configured to receive the acquired data from the at least one sensor and to transmit the acquired data to a remote processor separate from the fuel dispenser.

In another embodiment, a method for collecting payment data is provided. The method can include receiving proximity data indicating a presence of a card positioned at a first surface of a plate of a card reading device. The method can further include causing a sensor to acquire data encoded on a magnetic stripe of the card in response to detecting the presence of the card. The sensor can be disposed on a magnetic read head of a magnetic stripe reader, and the magnetic stripe reader can be positioned at a second surface of the plate that can be opposite the first surface. The method can further include determining payment data characterizing payment information associated with the card from the acquired data, and the method can further include transmitting the payment data.

In some embodiments, the proximity data can be generated by a proximity sensor configured to detect that the card is positioned at the first surface. In such an embodiment, the proximity sensor can be integrated into the plate. In other embodiments, the proximity sensor can be disposed at the second surface.

In some embodiments, the method can further include causing the magnetic read head to move along a track of the magnetic stripe reader to permit the sensor to acquire the data in response to detecting the presence of the card, and the track can be positioned to align with the magnetic stripe of the card when the card is positioned at the first surface.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DETAILED DESCRIPTION

Figure 1A:
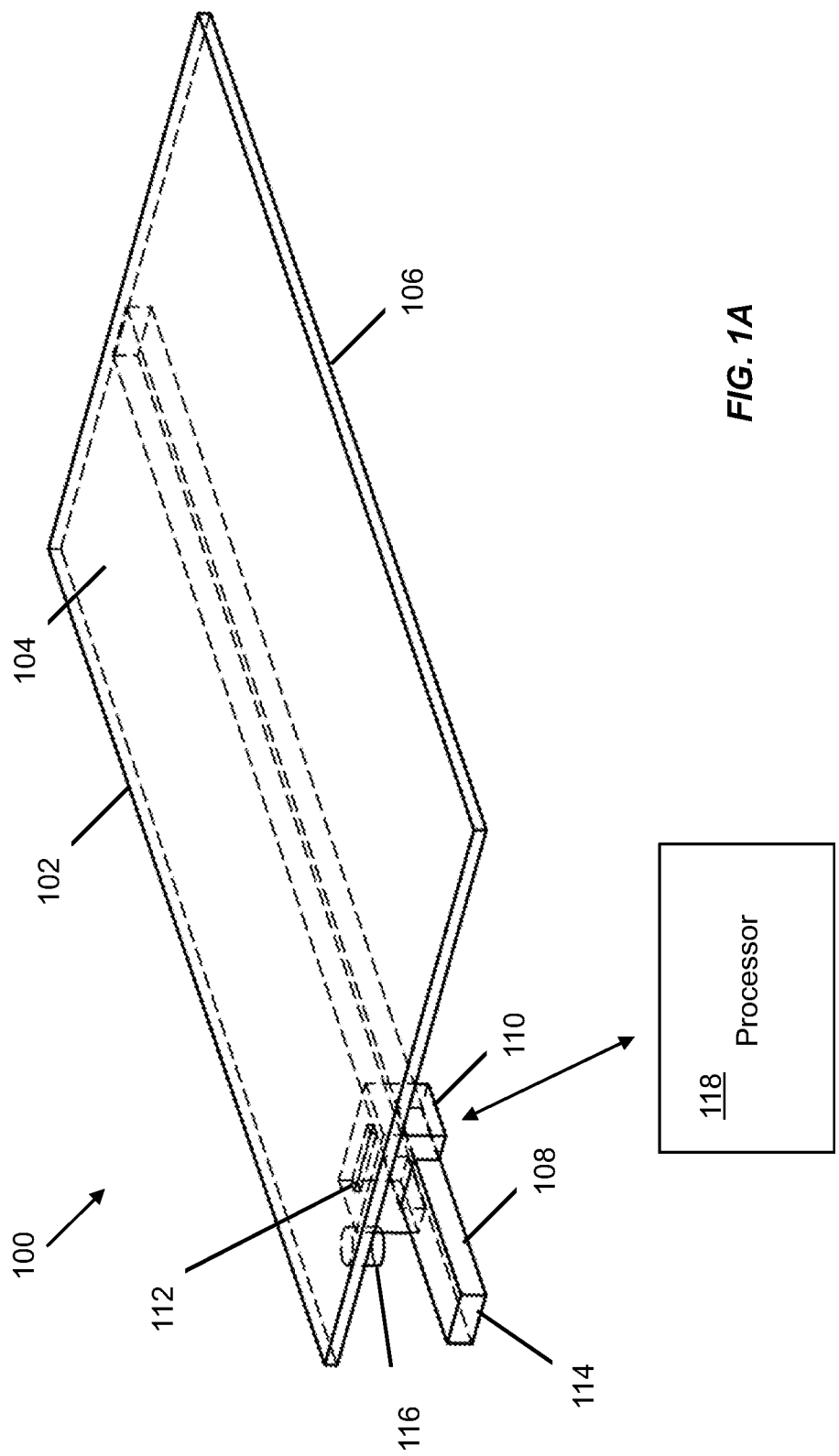
FIG. 1A is a perspective view of one embodiment of a card reader.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the dimensions of the subject in which the systems and devices will be used, the size and shape of components with which the systems and devices will be used, and the methods with which the systems and devices will be used.

Various card reader devices and systems for reading cards are provided. For example, such a card reader device includes a plate and a magnetic stripe reader disposed at a first side of the plate. The magnetic stripe reader includes a track and a magnetic read head slidably coupled to the track, and the magnetic read head includes a sensor disposed thereon that is configured to read data encoded on a magnetic stripe of a card disposed at a second side of the plate. When the card is positioned at the second side of the plate, the magnetic read head and the sensor are activated such that the magnetic read head slides along the track and the sensor acquires the data from the magnetic stripe as the magnetic read head moves along the track. As such, the card reader is configured to acquire the data encoded on a magnetic stripe without requiring the card to be inserted into the card reader, thereby preventing skimming of the payment data encoded on the magnetic stripe by an insertion-type card skimmer device. The card reading device can be used in a large number of applications. For example, as described in further detail later, the card reading device can be used in fuel dispensers to collect payment from a customer at the dispenser. However, the card reading device is not limited to use in a fuel dispenser, and it can be used in any payment setting that requires the acquisition of data encoded on a magnetic stripe of a card.

Figure 1B:
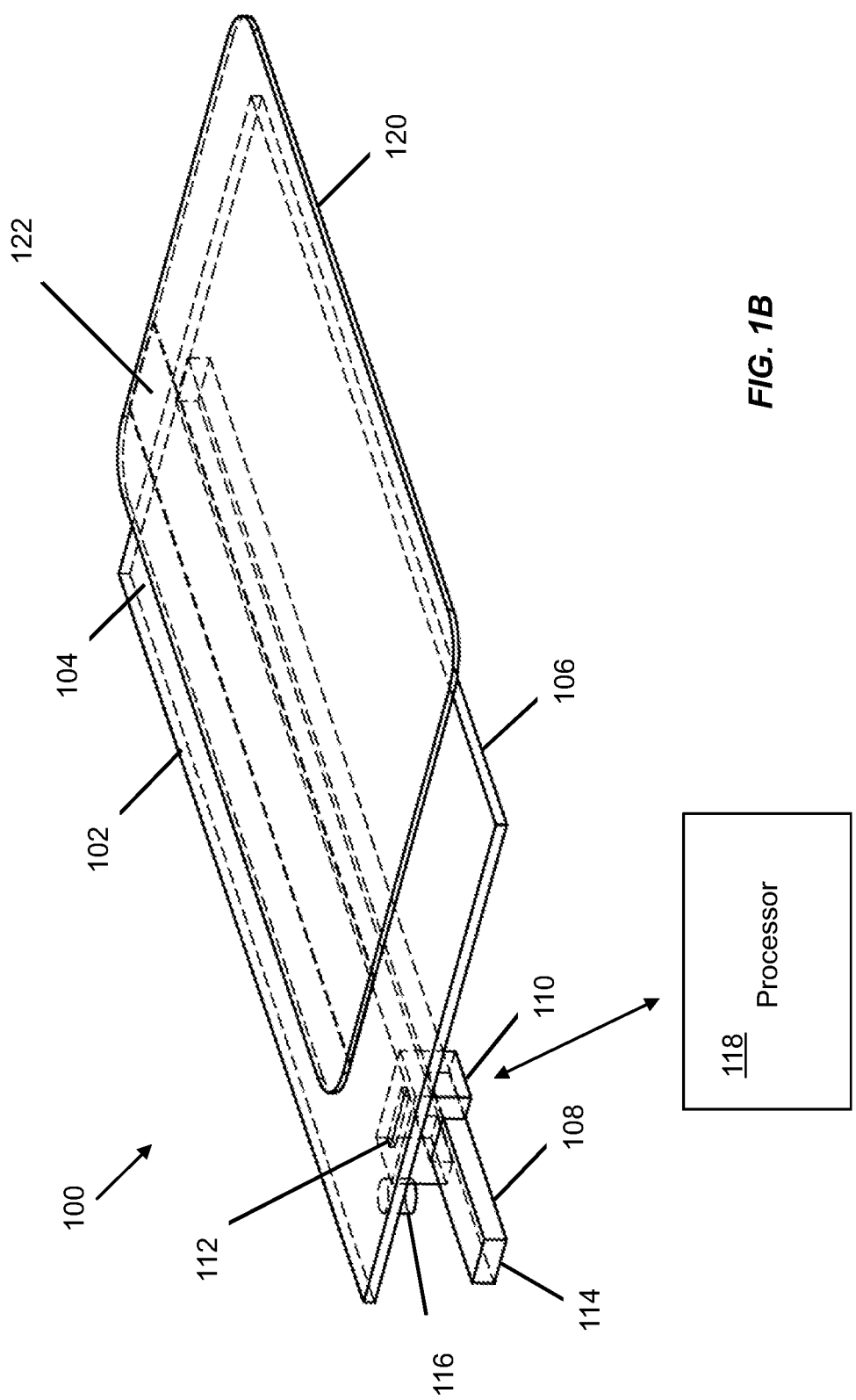
FIG. 1B is a perspective view of the card reader of FIG. 1A.

FIGS. 1A and 1B illustrate one exemplary embodiment of a card reader 100 that is configured to acquire the data encoded on a magnetic stripe 122 of a card 120 that characterizes payment data associated with the card 120. As shown, the card reader 100 includes a plate 102 having a first surface 104 and a second surface 106 that is opposite the first surface 104. The plate can be installed in a housing of any device, such as the aforementioned fuel dispenser, ATM, and/or payment terminal. When installed in such a housing, the first surface 104 of the plate 102 can form a part of an outer wall of the housing. The plate 102 can be impermeable to moisture and dirt of outdoor environments, so as to protect the housing of the device and the electronic components of the device stored therein. However, the plate 102 can be permeable to electromagnetic radiation such that the data encoded on the magnetic stripe 122 of the card 120, when placed next to the first surface 104, can be acquired by one or more sensors positioned at the second surface 106, as described in further detail below.

As shown in FIGS. 1A and 1B, the card reader 100 also includes a magnetic stripe reader 108 that is configured to read the data encoded on the magnetic stripe 122 of the card 120. The magnetic stripe reader 108 can be positioned at the second surface 106, inside the housing of the device, and as such is protected from water, dirt, and other contaminants. The magnetic stripe reader 108 includes a magnetic read head 110, at least one sensor 112 disposed on the magnetic read head 110 and configured to read the encoded data on the magnetic stripe 122 of the card 120 that characterizes the payment data, and a track 114 to which the magnetic read head 110 is slidably coupled. As shown in FIG. 1B, the track 114 is positioned along the second surface 106 of the plate 102, and as such the magnetic read head 110 and sensor 112 can be in substantial alignment with the magnetic stripe 122 when the card 120 is positioned on the first surface 104 of the plate 102. The magnetic read head 110 can be configured to slide along the track 114 and thereby permit the sensor 112 to read the data encoded on the magnetic stripe 122 of the card 120.

The card reader 100 can also include a proximity sensor 116 on the second surface 106 of the plate 102 that is configured to detect a presence of a card adjacent to or on the first surface 104 of the plate 102. In response to the proximity sensor 116 detecting the presence of the card 120, the magnetic read head 110 can be configured to automatically move along the track 114, and the sensor 112 can be activated to read the data encoded in the magnetic stripe 122 as the head 110 moves along the track 114. While the illustrated proximity sensor 116 is disposed on the first surface 104 of the plate 102, the proximity sensor 116 can be disposed at any location and/or can be integrated directly into the plate 102.

The card reader 100 can also include a processor 118 (schematically depicted in FIGS. 1A and 1B) that is in operable communication with the magnetic read head 110, the sensor 112, and the proximity sensor 116. The processor 118 can be configured to receive proximity data from the proximity sensor 116 that indicates the presence of the card at the first surface 104 when the card 120 is placed in proximity to the first surface 104 by a user. As mentioned above, in response to receiving the proximity data from the proximity sensor 116, the processor 118 can generate an instruction to cause the magnetic read head 110 to slide along the track 114 and to activate the sensor 112 to read the data encoded on the magnetic stripe 122 of the card 120 as the magnetic read head 110 slides along the track 114. The processor 118 can also receive the encoded data read by the sensor 112 from the magnetic stripe 122. In response to receiving the encoded data, the processor 118 can decode the encoded data to discern the payment data characterized by the encoded data and associated with the card 120. The processor 118 can then transmit the payment data to a remote processor, such as a payment server, for use in completing a transaction. In some implementations, the processor 118 can transmit the encoded data to the remote processor, which can decode the encoded data and thereby discern the payment data characterized by the encoded data and associated with the card 120.

In an exemplary use of the card reader 100, with reference to FIGS. 1A and 1B, a user can hold the card 120 up to the first surface 104 of the plate 102, positioning it as shown in FIG. 1B. The proximity sensor 116 can detect the presence of the card at the first surface 104 and generate proximity data indicating that the card 120 has been detected at the first surface 104. The proximity sensor 116 can transmit the proximity data to the processor 118, which can generate a command that causes the magnetic stripe reader 108 to acquire the data encoded on the magnetic stripe 122 of the card 120. The processor 118 can transmit the command to the magnetic stripe reader 108, which can cause the magnetic read head 110 to move along the track 114 and can cause the sensor 112 to activate and read the encoded data on the magnetic stripe 112. The sensor 112 can transmit data characterizing the encoded data to the processor, which can decode the encoded data and generate the payment data characterized by the card 120 from the data pattern. The processor 118 can transmit the generated payment data to a remote processor for further use in completing a transaction.

Figure 2A:
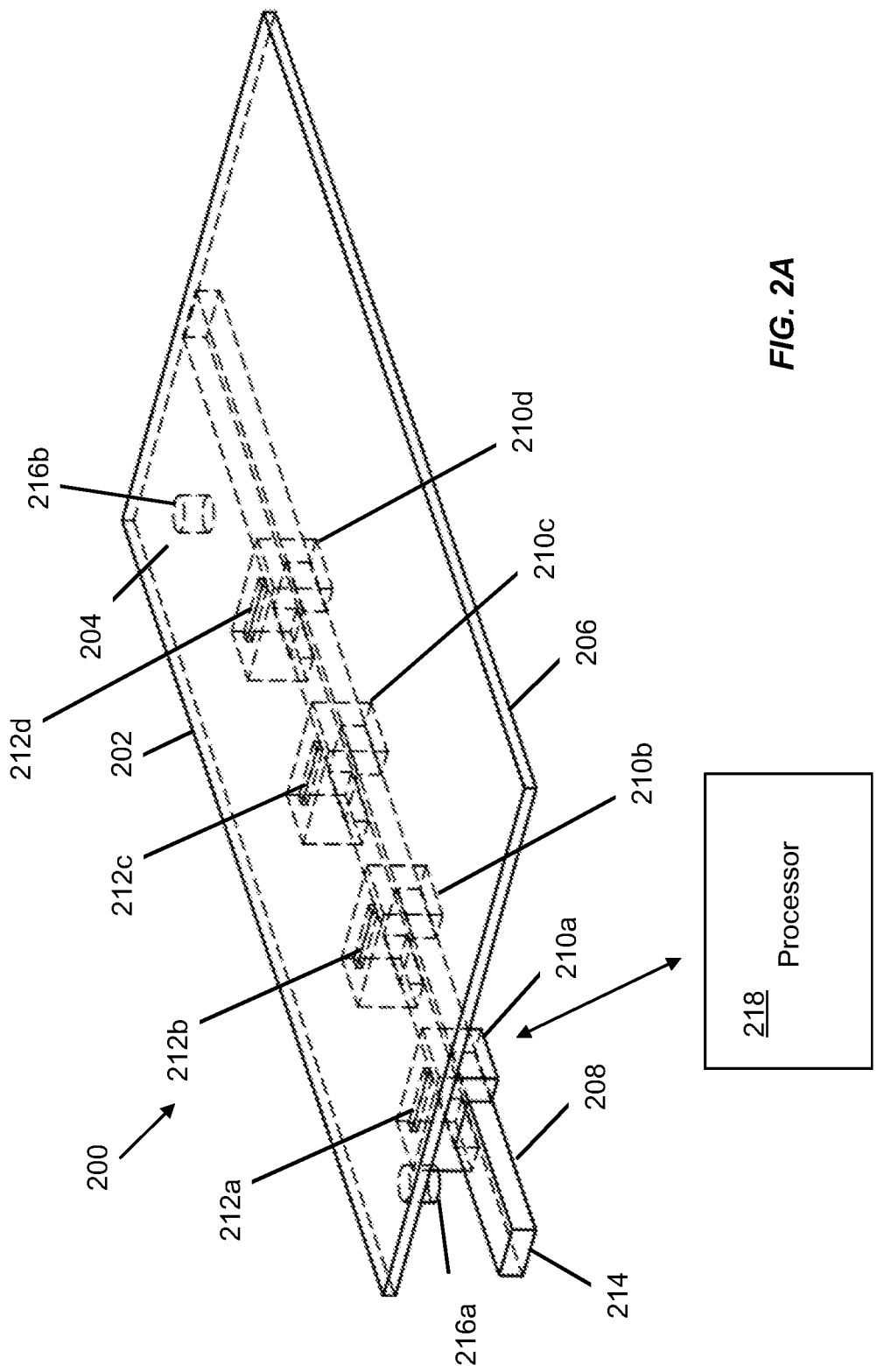
FIG. 2A is a perspective view of an additional embodiment of a card reader.
Figure 2B:
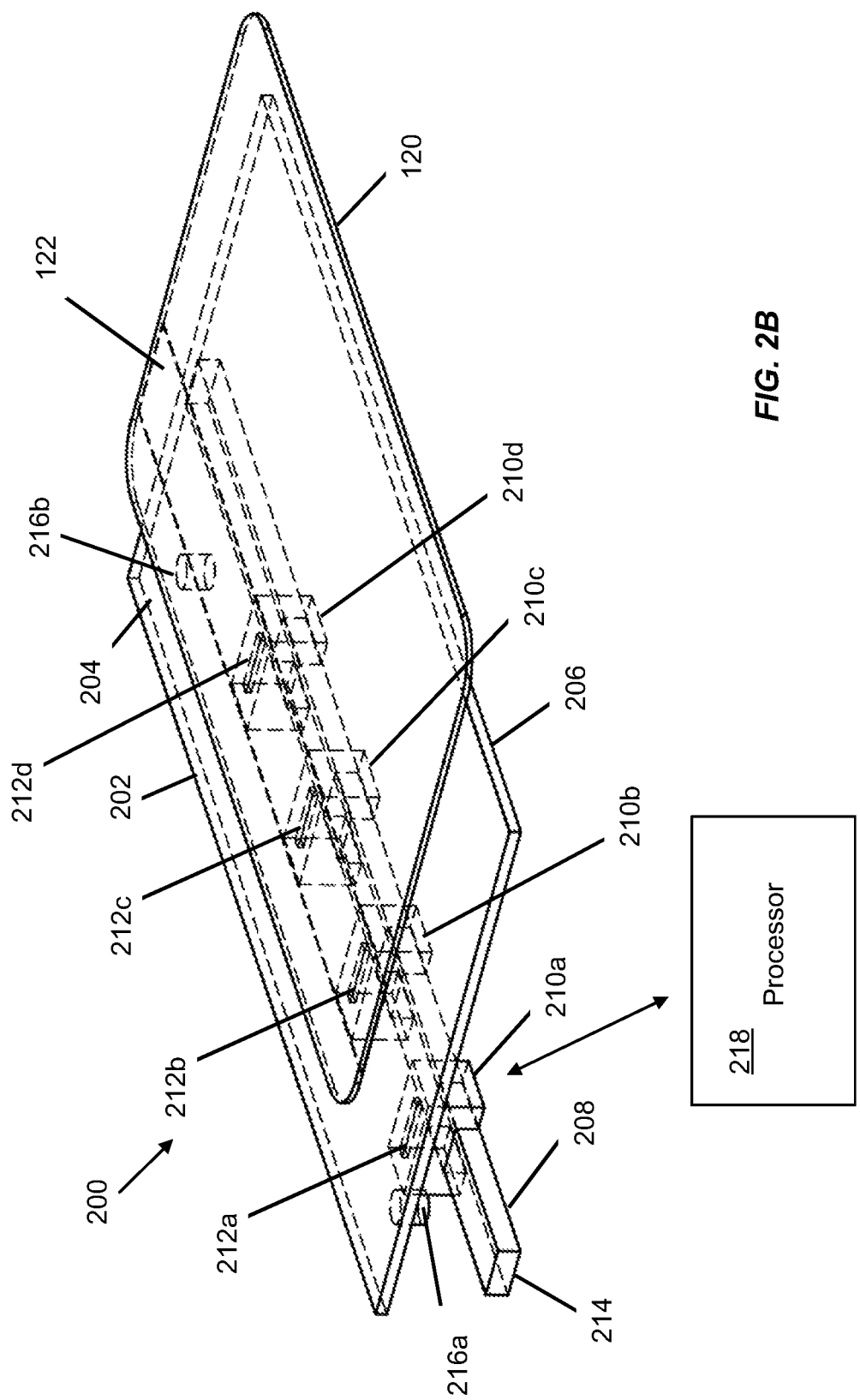
FIG. 2B is a perspective view of the card reader of FIG. 2A.

FIGS. 2A and 2B show another embodiment of a card reader 200 that is configured to acquire the data encoded on a magnetic stripe 122 of a card 120 that characterizes payment data associated with the card 120. Card reader 200 is substantially similar to card reader 100 and includes substantially the same components as card reader 100. However, instead of having a single magnetic read head, as included in card reader 100, card reader 200 includes a plurality of magnetic read heads 210a-d, and each of the plurality of magnetic read heads 210a-d includes at least one sensor 212a-d that is configured to read a portion of the data encoded on the magnetic stripe 122 of the card 120. Each of the plurality of magnetic read heads 210a-d is configured to slide along a portion of the track 214, and each of the corresponding sensors 212a-d reads the data encoded on the portion of the magnetic stripe 122 of the card 120 that is in range of the sensor. As each of the plurality of magnetic read heads 210a-d travels along only a portion of the track 214 when the data is read by the sensors 212a-d, the reduced movement of these components can provide improved reliability of the card reader 200.

In some embodiments, each of the plurality of magnetic read heads 210a-d remain stationary on the track, and each of the sensors 212a-d is a Hall sensor that is configured to read the data encoded on the magnetic stripe 122 without moving. In addition, card reader 200 can include a plurality of proximity sensors 216*a,b*, and each of the proximity sensors 216 *a, b* has functionality similar to proximity sensor 116 of card reader 100.

In an exemplary use of the card reader 200, with reference to FIGS. 2A and 2B, a user can hold the card 120 up to the first surface 204 of the plate 202, positioning it as shown in FIG. 2B. The proximity sensors 216*a,b* can detect the presence of the card 120 at the first surface 204 and generate proximity data indicating that the card 120 has been detected at the first surface 204. The proximity sensors 216*a,b* can transmit the proximity data to the processor 218, which can generate a command that causes the magnetic stripe reader 208 to acquire the data encoded on the magnetic stripe 122 of the card 120. The processor 218 can transmit the command to the magnetic stripe reader 208, which can cause each of the magnetic read heads 210*a-d* to move along the track 214 and can cause each of the sensors 212*a-d* to activate and read the encoded data on the magnetic stripe 120. The processor 218 can transmit the command to the magnetic stripe reader 208, which causes each of the magnetic read heads 210*a-d* to move along a portion of the track 214 and each of the sensors 212*a-d* coupled to their respective magnetic read heads 210*a-d* to read a portion of the encoded data on the magnetic stripe 122 that that is in range of the sensor. Each of the sensors 212*a-d* can transmit data characterizing the read portion of the encoded data to the processor 218, which can compile the received portions to form a complete version of the data encoded on the magnetic stripe 122 of the card 120. The processor 218 can decode the complete encoded data set and generate the payment data characterized by the card 120 from the decoded data set. The processor 218 can transmit the generated payment data to a remote processor for further use in completing a transaction.

Figure 3A:
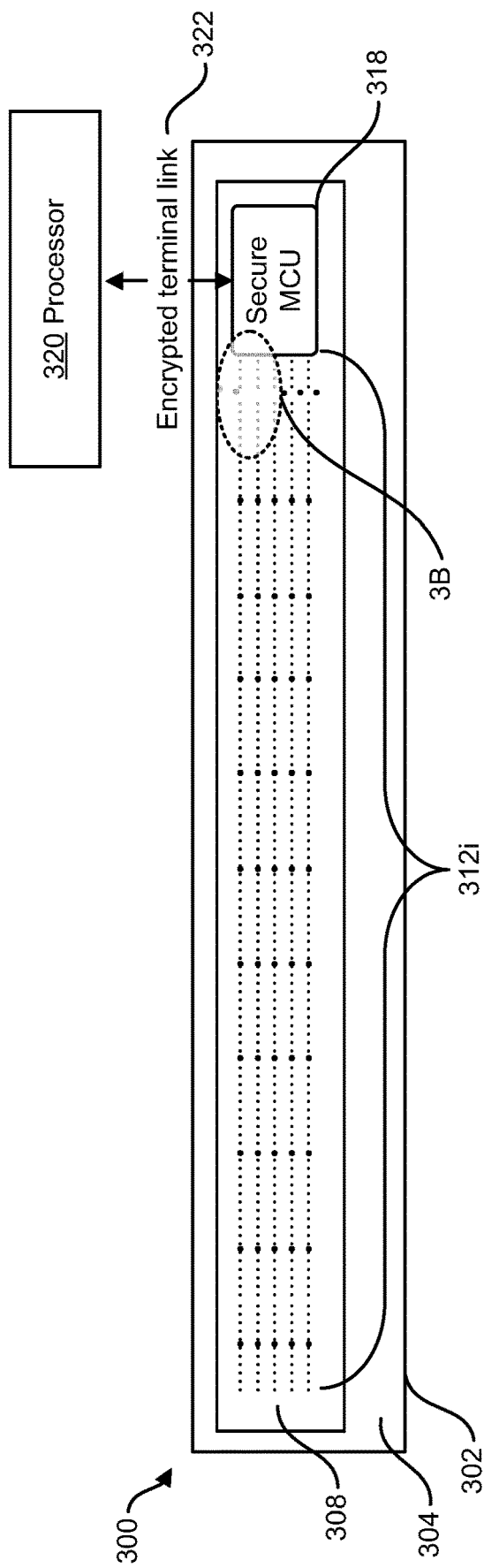
FIG. 3A is a top view of an additional embodiment of a card reader.
Figure 3B:
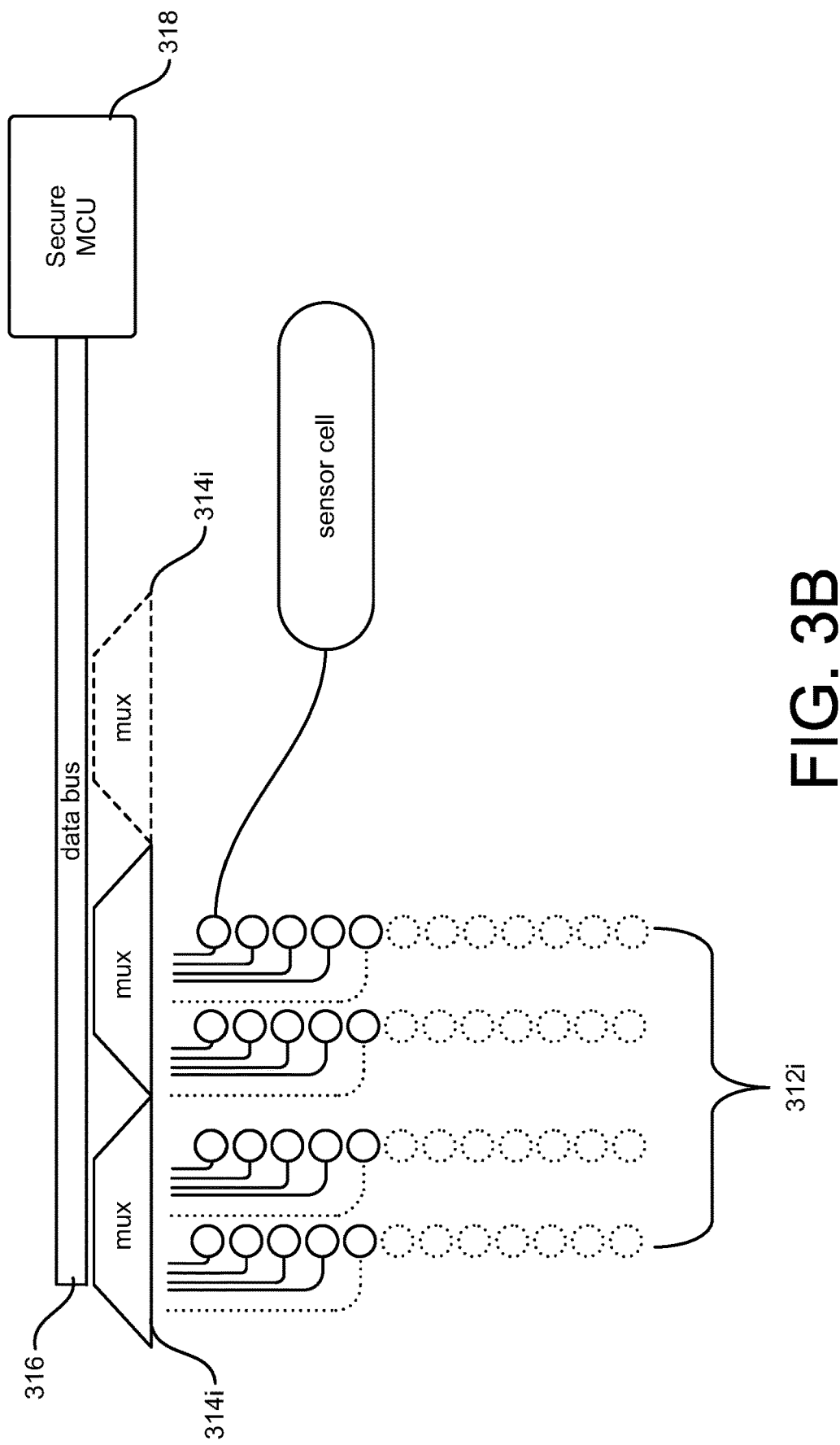
FIG. 3B is a detailed view of a portion of the card reader of FIG. 3A.

FIGS. 3A-3B show another embodiment of a card reader 300 that is configured to read the magnetic stripe of a card and thereby permit the card reader 300 to acquire the payment data from the card. Similar to card readers 100 and 200, card reader 300 features a plate 302 having a first surface 304 and a second surface (not shown) opposite the first surface 304. However, instead of utilizing read head(s) and a track, such as those of card readers 100 and 200, the card reader 300 includes a magnetic stripe reader bar 308 that is positioned at the second surface of the plate 302 and configured to read the data encoded on a magnetic stripe of a card (not shown).

As shown in FIGS. 3A-3B, the magnetic stripe reader bar 308 includes a plurality of sensor cells 312*i* that are configured to read the magnetic stripe of the card and acquire the data encoded on the magnetic stripe. The sensor cells 312*i* are stationary throughout their operation and, as such, the card reader 300 has no moving parts. As shown in FIG. 3B, which provides a detailed view of a portion of the sensor cells 312*i*, the sensor cells 312*i* can be arranged in a series of rows on the magnetic stripe reader bar 308 such that each of the sensor cells 312*i* can read a portion of the magnetic stripe of the card that is in range of each of the sensor cells 312*i*. In some implementations, the sensor cells can be Hall sensors. And, in some implementations, the sensor cells can also be configured to detect the presence of a card at the first surface 304 of the plate 302 and to generate and transmit proximity data indicating the presence of the card.

As shown in FIG. 3B, the magnetic stripe reader bar 308 can also include one or more multiplexers 314*i* that are configured to receive and transmit data to/from the sensor cells 312*i*. The multiplexers 314*i* are further configured to combine data received from each of the sensor cells 312*i* in a given row into a single output data stream containing the data received from all of the sensor cells 312*i* in a row. The magnetic stripe reader bar 308 can also include a data bus 316 that is in operable communication with each of the multiplexers 314*i*. The data bus 316 can be configured to receive the single output data streams from each of the multiplexers 314*i* and to transmit them to a micro control unit 318 that is also incorporated into the magnetic stripe reader bar 308. The micro control unit 318 can be a secure processor that can receive the single output data streams from the data bus and can be configured to compile the single output data streams generated by each of the multiplexers 314*i* to form a complete set of data received from all of the sensor cells 312*i*. The micro control unit 318 can also be configured to generate and transmit a command to the sensor cells 312*i* (via the data bus 316 and multiplexers 314*i*) that cause the sensor cells 312*i* to read the data encoded on the magnetic stripe of the card. In some implementations, the micro control unit 318 can generate the command based on proximity data received from the sensor cells 312*i* (via the multiplexers 314*i* and the data bus 316) that indicates a card is present at the first surface 304 of the plate 302. In some implementations, the micro control unit 318 can also be configured to decode the encoded data acquired by the sensor cells 312*i* from the magnetic stripe of the card and to thereby generate the payment data encoded on the magnetic stripe and associated with the card. The micro control unit 318 can also be configured to transmit the generated payment data to a remote processor 320, via an encrypted terminal link 322, for further use in completing a transaction.

In an exemplary use of the card reader 300, with reference to FIGS. 3A and 3B, a user can hold their card up to the first surface 304 of the plate 302. One or more of the sensor cells 312*i* can detect the presence of the card at the first surface 304 and generate proximity data indicating that the card has been detected at the first surface 304. Each of the sensor cells 312*i* that that has detected the presence of the card and generated proximity can transmit the proximity data to the multiplexer 314*i* to which it is operably coupled. The multiplexer 314*i* can aggregate the received proximity data received from each of the presence-detecting sensor cells 312*i*, and the multiplexer 314*i* can transmit the data to the micro control unit 318 via the data bus 316. The micro control unit 318 can generate a command that causes each of the sensor cells 312*i* of the magnetic stripe reader bar 308 to acquire the portion of the data encoded on the magnetic stripe of the credit card that is in range of the respective sensor cell 312*i*, and the micro control unit 318 can transmit the command to each of the sensor cells 312*i* (via the data bus 316 and multiplexers 314). In response to receiving the command, the sensor cells 312*i* can read the portions of the encoded data on the magnetic stripe that are within range of the sensor cells 312*i*. Each of the sensor cells 312*i* can transmit the acquired encoded data portions to their respective multiplexers 314*i*, which can aggregate the received encoded data portions and send them to the micro control unit 318 via the data bus 316. The micro control unit can compile the received data portions to form a complete encoded data set. The processor can then decode the complete encoded data set and generate the payment data characterized by the card from the decoded data set. The processor can transmit the generated payment data to the remote processor 320 via encrypted terminal link 322 for further use in completing a transaction.

In some implementations, the card readers described herein can be used in conjunction with a partial-insertion EMV reader that is configured to obtain payment data from a chip incorporated into a card that stores the payment data. The partial-insertion EMV reader can be in operable communication with the remote processors described herein and can transmit the obtained payment data to the remote processors for further use in completing a transaction.

Figure 4:
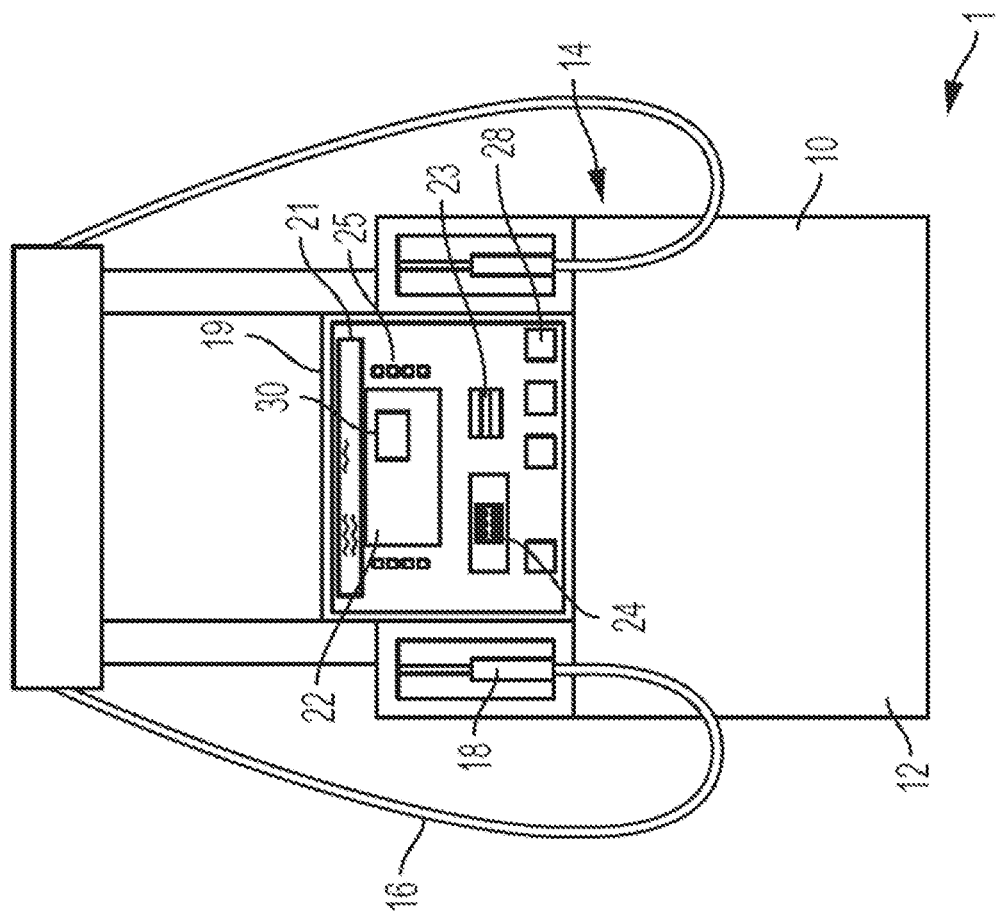
FIG. 4 is a front view of a fuel dispenser.

As previously indicated, the card readers described herein and shown in FIGS. 1A-3B can be used in a large number of applications. As a non-limiting example, card readers are used in fuel dispensers to collect payment from a customer at the dispenser. FIG. 4 illustrates an exemplary embodiment of a fuel dispenser 1 that generally includes a housing base 10 having a front side 12 and a back side 14. While only the front side 12 is discussed herein, the back side 14 can optionally have similar features. In general, the housing base 10 can contain hydraulic(s) (such as fuel pump(s)), meter(s), and/or tube arrangement(s) (not shown) for transportation of fuel to one of more hoses and nozzles. The illustrated dispenser 1 has two hoses 16, each having a nozzle 18 located at a terminal end of the hose 16. However, the fuel dispenser 1 can have any number of hoses. A control system (not shown) can be disposed in the housing base 10 and is coupled to the hydraulic(s), meter(s), and tube arrangement(s). An electronics module 19 is disposed on the housing base 10 and is coupled to the control system. The electronics module 19 can include a processor and it can control the hydraulics in the housing base 10 through the control system, allowing fuel to be dispensed via each nozzle 18.

The illustrated electronics module 19 has a price and volume display 21 that presents information concerning the price and volume of any fuel being dispensed, and a graphical display 22 that presents a user interface for displaying information to a customer and/or for interacting with a customer. The illustrated electronics module 19 also has a keypad 24 and buttons 25 that allow the user to interact with the electronics module 19, a card reader 23 (such as card readers 100, 200, and 300 described above) that allows the user to pay for purchases, and grade selection buttons 28 that allow the user to select the grade of fuel to be dispensed by the fuel dispenser 1. While only one fuel dispenser 1 is shown, one or more fuel dispensers 1 can be grouped together in a single location. Additionally, the fuel dispenser 1 can contain more than one hose 16 and nozzle 18 combination. For example, four hoses 16 and nozzles 18 can be provided for use on the front side 12 of the housing base 10, while an additional four hoses 16 and nozzles 18 can be provided for use on the back side 14. A person skilled in the art will appreciate that the fuel dispenser can have a variety of configurations and the illustrated dispenser configuration is merely representative of one type of fuel dispenser.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A card reading device, comprising:
   a plate including a first surface and a second surface opposite the first surface; and
   a magnetic stripe reader disposed at the second surface and including
      at least one sensor configured to acquire data from a magnetic stripe of a card disposed at the first surface, and
      at least one proximity sensor configured to detect that the card is disposed at the first surface and to cause the at least one sensor to acquire the data from the magnetic stripe.

2. The card reading device of claim 1, wherein the at least one sensor is disposed on a magnetic read head.

3. The card reading device of claim 2, wherein the magnetic stripe reader comprises a track disposed along the second surface, wherein the magnetic read head is coupled to the track and configured to slide along the track to allow the at least one sensor to acquire the data from the magnetic stripe.

4. The card reading device of claim 1, wherein the at least one proximity sensor is integrated into the plate.

5. The card reading device of claim 1, wherein the at least one proximity sensor is disposed at the second surface.

6. The card reading device of claim 2, further comprising a processor in operable communication with the at least one proximity sensor, the magnetic read head, and the at least one sensor, the processor configured to receive proximity data from the at least one proximity sensor indicating that the card is disposed at the first surface, to cause the magnetic read head to slide along the track, and to cause the at least one sensor to acquire the data from the magnetic stripe based on the received proximity data.

7. The card reading device of claim 1, wherein the at least one sensor comprises a plurality of sensors, and wherein each of the plurality of sensors is disposed on one of a plurality of magnetic read heads.

8. The card reading device of claim 7, wherein the at least one proximity sensor comprises a plurality of proximity sensors configured to detect that the card is disposed at the first surface.

9. The card reading device of claim 8, further comprising a processor in operable communication with each of the plurality of proximity sensors and the plurality of sensors, the processor configured to receive proximity data from one or more of the plurality of proximity sensors indicating that the card is disposed at the first surface and to cause the plurality of sensors to acquire the data from the magnetic stripe based on the received proximity data.

10. The card reading device of claim 7, wherein each of the plurality of sensors is configured to detect that the card is disposed at the first surface.

11. The card reading device of claim 10, wherein one or more of the plurality of sensors is a Hall element.

12. The card reading device of claim 10, further comprising a processor in operable communication with each of the plurality of sensors, the processor configured to receive proximity data from one or more of the plurality of sensors indicating that the card is disposed at the first surface and to cause the plurality of sensors to acquire the data from the magnetic stripe based on the received proximity data.

13. The card reading device of claim 12, wherein each of the plurality of sensors acquires a portion of the data from the magnetic stripe, and wherein the processor is further configured to receive the acquired data portions from each of the sensors, to determine the data characterizing the card from the acquired data portions, and to provide the data characterizing the card to a second processor remote from the card reading device.

14. A system for collecting payment data, comprising:
   a payment terminal including a housing and an electronics module disposed in the housing; and
   a card reading device disposed on the electronics module, the card reading device having a plate including a first surface and a second surface opposite the first surface, and a magnetic stripe reader disposed at the second surface, the magnetic stripe reader being configured to acquire payment data through the plate from a magnetic stripe of a card disposed at the first surface.

15. The system of claim 14, wherein the magnetic stripe reader comprises a magnetic read head including at least one sensor configured to acquire the data from the magnetic stripe.

16. The system of claim 15, wherein the magnetic stripe reader comprises a track disposed along the second surface, wherein the magnetic read head is coupled to the track and configured to slide along the track to allow the at least one sensor to acquire the data from the magnetic stripe.

17. The system of claim 16, wherein the magnetic stripe reader further comprises a proximity sensor configured to detect that the card is disposed at the first surface.

18. The system of claim 17, further comprising a processor in operable communication with the proximity sensor, the magnetic read head, and the at least one sensor, the processor configured to receive proximity data from the proximity sensor indicating that the card is disposed at the first surface, to cause the magnetic read head to slide along the track, and to cause the at least one sensor to acquire the data from the magnetic stripe based on the received proximity data.

19. The system of claim 18, wherein the processor is configured to receive the acquired data from the at least one sensor and to transmit the acquired data to a remote processor separate from the fuel dispenser.

20. The system of claim 14, wherein the payment terminal is disposed in a fuel dispenser housing.

21. A method for collecting payment data, comprising:

receiving proximity data indicating a presence of a card positioned at a first surface of a plate of a card reading device;

in response to detecting the presence of the card, causing a sensor to acquire data encoded on a magnetic stripe of the card, the sensor disposed on a magnetic read head of a magnetic stripe reader, the magnetic stripe reader positioned at a second surface of the plate, the second surface opposite the first surface;

determining payment data characterizing payment information associated with the card from the acquired data; and transmitting the payment data.

22. The method of claim 21, wherein the proximity data is generated by a proximity sensor configured to detect that the card is positioned at the first surface.

23. The method of claim 21, further comprising:

in response to detecting the presence of the card, causing the magnetic read head to move along a track of the magnetic stripe reader to permit the sensor to acquire the data, the track positioned to align with the magnetic stripe of the card when the card is positioned at the first surface.

24. The method of claim 22, wherein the proximity sensor is integrated into the plate.

25. The method of claim 22, wherein the proximity sensor is disposed at the second surface.

* * * * *